United States Patent
Kaneko et al.

[11] Patent Number: 5,234,806
[45] Date of Patent: Aug. 10, 1993

[54] SILVER HALIDE PHOTOGRAPHIC LIGHT-SENSITIVE MATERIALS

[75] Inventors: Satoshi Kaneko; Akira Tanaka, both of Nagaokakyo, Japan

[73] Assignee: Mitsubishi Paper Mills Limited, Tokyo, Japan

[21] Appl. No.: 802,299

[22] Filed: Dec. 4, 1991

[30] Foreign Application Priority Data

Dec. 13, 1990 [JP] Japan .................. 2-419171

[51] Int. Cl.$^5$ .............................................. G03C 1/10
[52] U.S. Cl. ................................ 430/579; 430/573; 430/578; 430/583; 430/584; 430/587; 430/588; 430/592
[58] Field of Search ............... 420/592, 587, 584, 578, 420/579, 582, 583, 598, 573

[56] References Cited

U.S. PATENT DOCUMENTS 4,266,003  5/1981  Ikeda et al. .......................... 430/592
4,965,183  10/1990  Mee et al. ............................ 430/578

Primary Examiner—Charles L. Bowers, Jr.
Assistant Examiner—Thorl Chea
Attorney, Agent, or Firm—Cushman, Darby & Cushman

[57] ABSTRACT

The present invention provides dyes markedly excellent as sensitizing dyes for silver halide photographic light-sensitive materials. Said dyes are represented by the following formula (I):

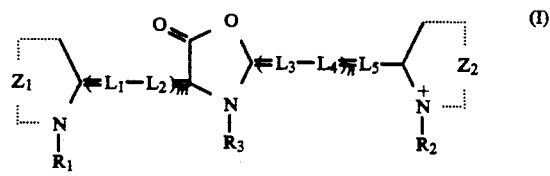

wherein $R_1$ and $R_2$ may be identical or different and each represents an alkyl group, an aralkyl group, an alkenyl group or an aryl group, $R_3$ represents a heterocyclic group, $Z_1$ and $Z_2$ may be identical or different and each represents a group of atoms necessary to form a 5- or 6-membered nitrogen-containing heterocyclic ring, X represents a counter ion, $L_1$ to $L_5$ each represents a methine group, and m and n each represents 0, 1 or 2.

2 Claims, No Drawings

SILVER HALIDE PHOTOGRAPHIC LIGHT-SENSITIVE MATERIALS

BACKGROUND OF THE INVENTION

The present invention relates to photographic spectral sensitizing dyes and more particularly, to dyes useful as sensitizing dyes used for silver halide photographic light-sensitive materials.

Silver halide photographic light-sensitive materials are required to have high sensitivity in respectively different specific wavelength regions depending on their use. As one of techniques for such silver halide photographic light-sensitive materials, it has been well known to add various kinds of cyanine dyes and merocyanine dyes to silver halide photographic light-sensitive materials thereby to very effectively enhance the sensitivity in a specific wavelength region longer than the sensitive wavelength inherent to the silver halides.

When spectral sensitization with dyes is applied to silver halide photographic emulsions, not only the dyes must impart spectral sensitization effect and enhance the sensitivity, but also they must satisfy the following requirements.

(1) The spectral sensitization range is proper.
(2) Stable photographic characteristics are maintained during storage of light-sensitive materials.
(3) Stain or fog caused by residual dyes added for spectral sensitization is not left after development.
(4) They have no unfavorable correlation with other photographic additives.

Considerably large number of sensitizing dyes have been known, but a few of them satisfy the above requirements such as sensitizability and photographic characteristics.

SUMMARY OF THE INVENTION

Accordingly, the object of the present invention is to provide photographic spectral sensitizing dyes which satisfy the above requirements.

The inventors have found that the dyes represented by the following formula (I) can attain the above object.

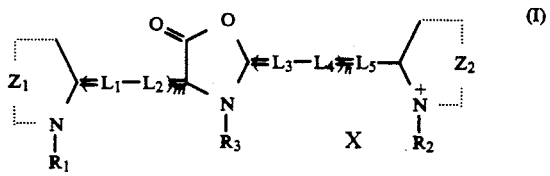

(I)

wherein $R_1$ and $R_2$ may be identical or different and each represents an alkyl group (for example, a lower alkyl group such as methyl, ethyl, propyl or butyl, a hydroxyalkyl group such as β-hydroxyethyl or γ-hydroxypropyl, an alkoxyalkyl group such as β-methoxyethyl or β-methoxypropyl, an acyloxyalkyl group such as γ-acetoxyethyl, β-acetoxypropyl or β-benzoyloxyethyl, a carboxyalkyl group such as carboxymethyl or β-carboxyethyl, an alkoxycarbonylalkyl group such as methoxycarbonylmethyl, ethoxycarbonylmethyl or β-ethoxycarbonylethyl, or a sulfoalkyl group such as β-sulfoethyl, γ-sulfopropyl or δ-sulfobutyl), an aralkyl group (for example, benzyl, phenethyl or sulfobenzyl), an alkenyl group (for example, allyl), or an aryl group (for example, phenyl, tolyl, methoxyphenyl, chlorophenyl, carboxyphenyl, sulfophenyl or naphthyl); $R_3$ represents a heterocyclic group {for example, 3-pyridyl, 4-tetrahydropyranyl, 3-tetrahydrofuryl, 4-(1-methylpiperidyl), 4-(1-acetylpiperidyl), 4-(1-ethoxycarbonylpiperidyl), or 4-tetrahydrothiopyranyl}; $Z_1$ and $Z_2$ may be identical or different and each represents a group of atoms necessary to form a 5- or 6-membered nitrogen-containing heterocyclic ring, examples of $Z_1$ and $Z_2$ are oxazoline ring, oxazole ring, benzoxazole ring, benzisoxazole ring, naphthoxazole ring, thiazoline ring, thiazole ring, benzothiazole ring, naphthothiazole ring, selenazoline ring, selenazole ring, naphthoselenazole ring, tellurazole ring, benzotellurazole ring, naphthotellurazole ring, pyridine ring, quinoline ring, benzoquinoline ring, indolenine ring, benzindolenine ring, benzimidazole ring, and pyrroline ring, and these heterocyclic rings, condensed benzene rings and naphthalene rings may have a substitutent such as an alkyl group, an aryl group, an alkoxy group (for example, methoxy, ethoxy, or propoxy), a hydroxy group, a carboxy group, an alkoxycarbonyl group (for example, methoxycarbonyl or ethoxycarbonyl), or a halogen atom (for example, fluorine, chlorine, bromine or iodine); X represents a counter ion and X represents an acid anion (for example, an alkylsulfuric acid ion such as methylsulfuric acid or ethylsulfuric acid, thiocyanic acid ion, toluenesulfonic acid ion, a halogen such as chlorine, bromine or iodine, or perchloric acid ion) unless $R_1$, $R_2$, $Z_1$ and $Z_2$ have acid substituent, and when one acid substituent is present, X is not present because an inner salt is formed, and when two or more acid substituents are present, X represents a cation such as an alkali metal atom (for example, sodium or potassium) or an organic ammonium (for example, triethylammonium, tributylammonium or pyridinium); $L_1$–$L_5$ each represents a methine group (which may have a substituent such as the alkyl group, the aryl group or the alkoxy group mentioned above and which may link to each other to form a 5- or 6-membered ring); and m and n each represents 0, 1 or 2.

Typical examples of the sensitizing dyes represented by the formula (I) are enumerated below, but the present invention is never limited thereto.

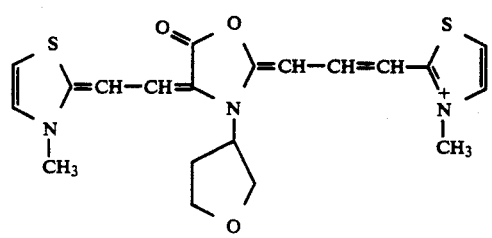

Compound (1)

-continued
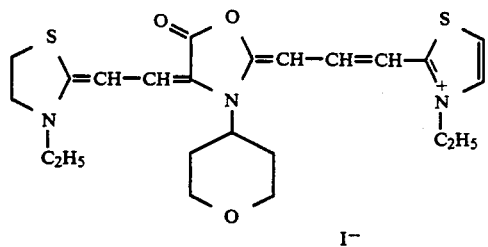
Compound (2)
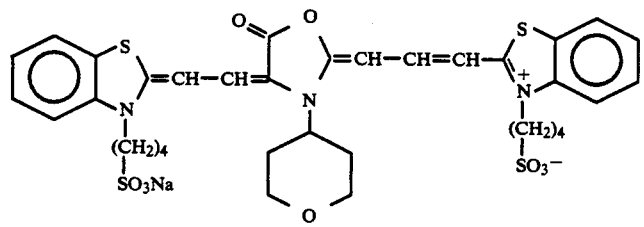
Compound (3)
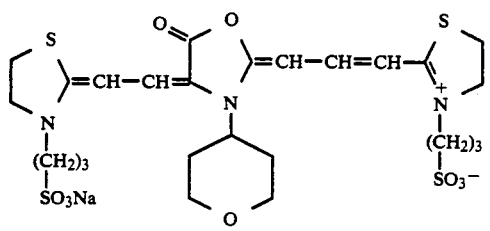
Compound (4)
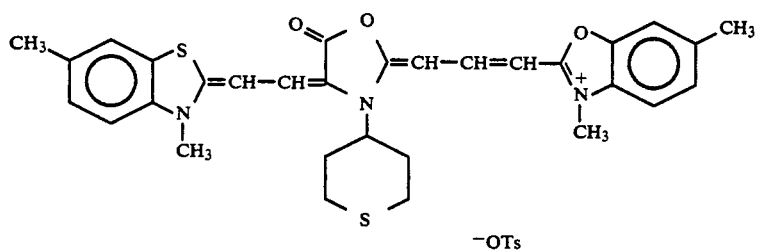
Compound (5)
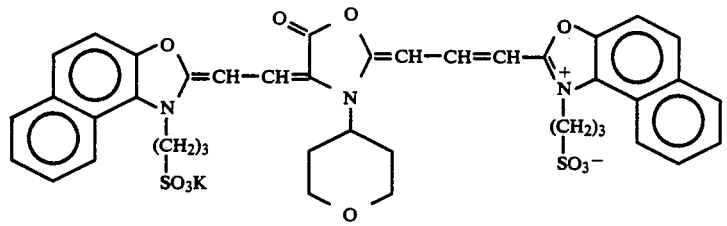
Compound (6)
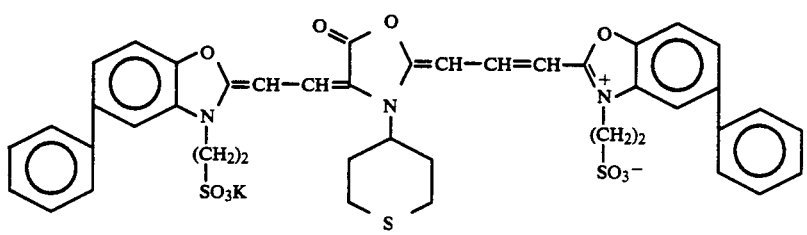
Compound (7)

-continued
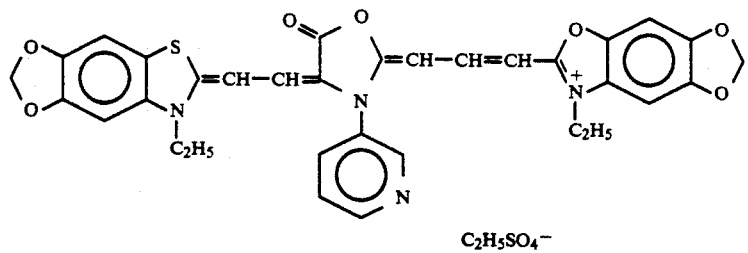
Compound (8)
$C_2H_5SO_4^-$
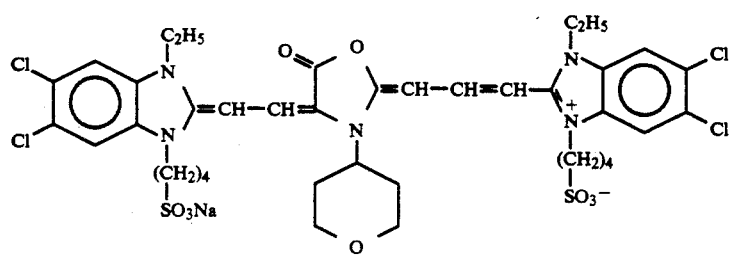
Compound (9)
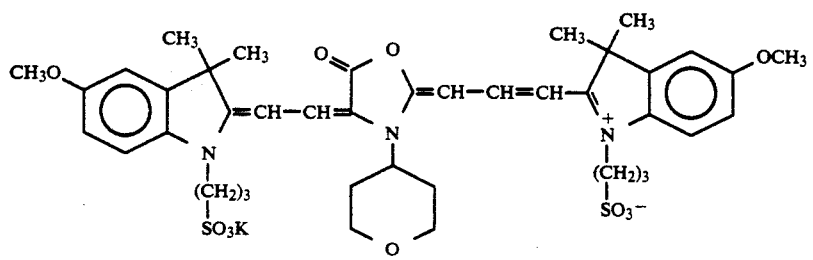
Compound (10)
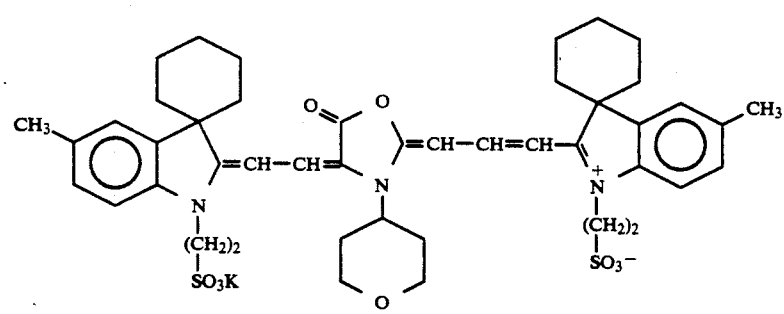
Compound (11)
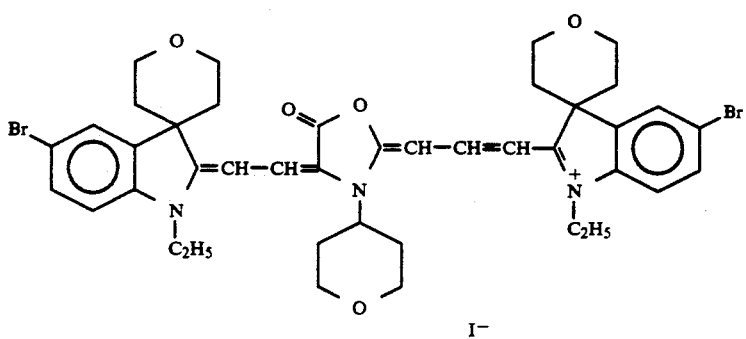
Compound (12)
$I^-$ -continued
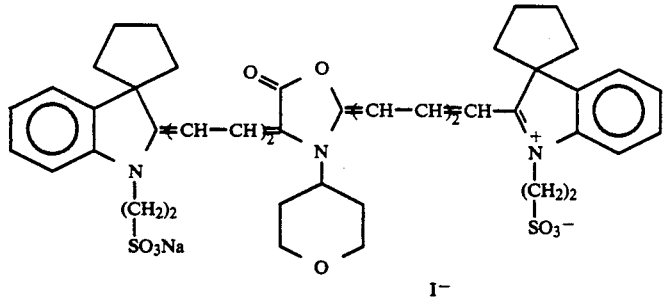
Compound (13)
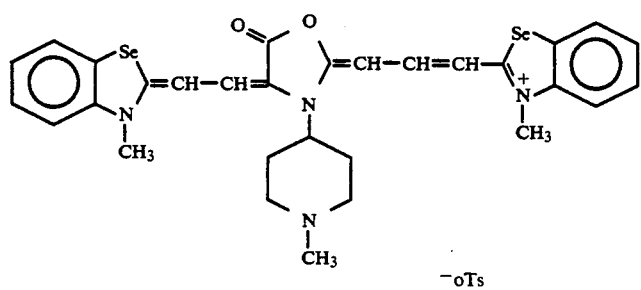
Compound (14)
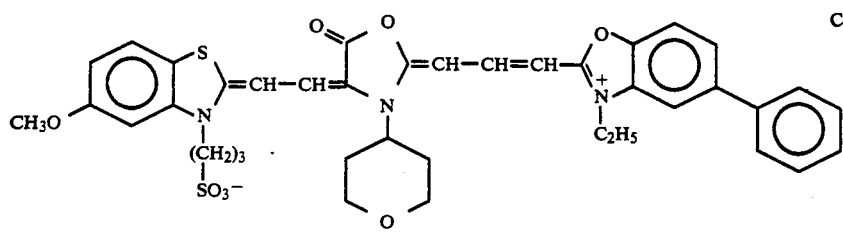
Compound (15)
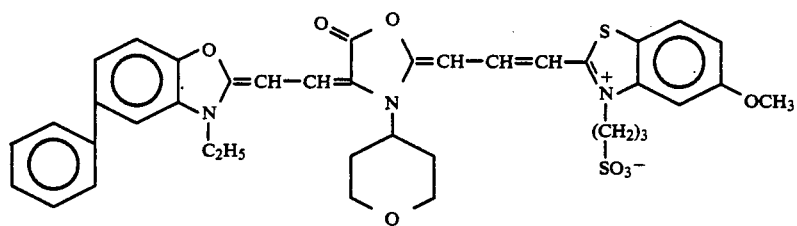
Compound (16)
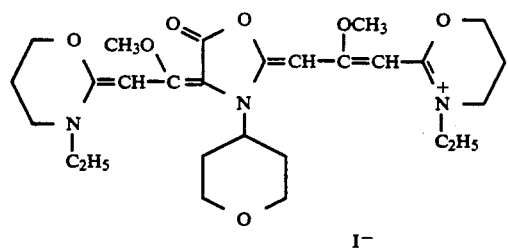
Compound (17)
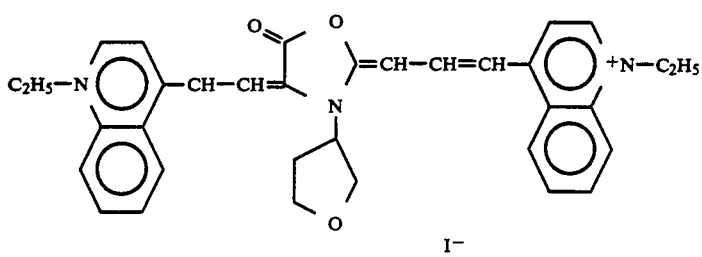
Compound (18)

-continued

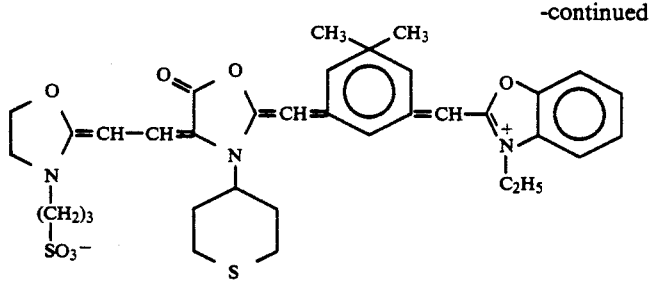

Compound (19)

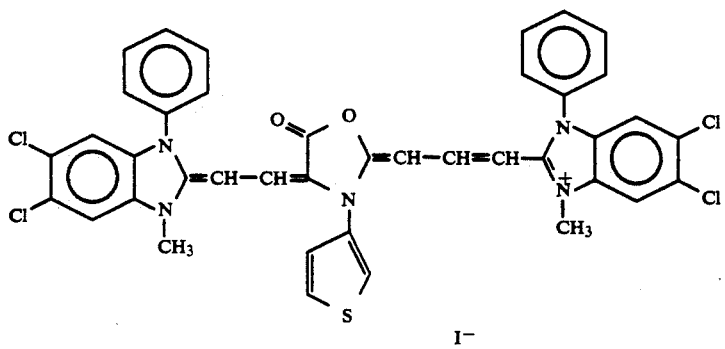

Compound (20)

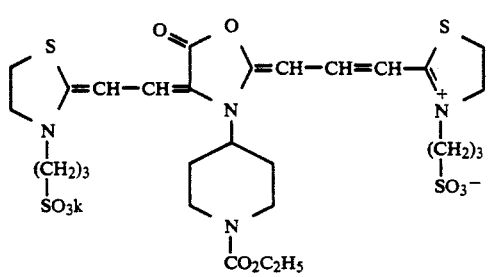

Compound (21)

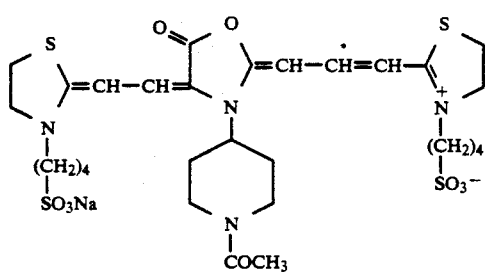

Compound (22)

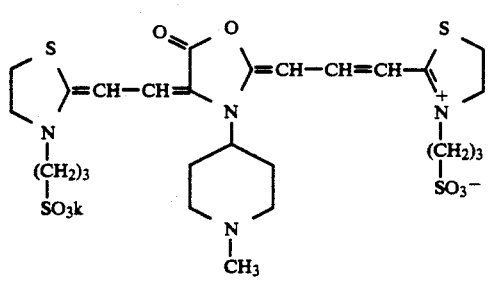

Compound (23)

Next, typical examples of synthesis of some compounds represented by the formula (I) are shown below.

SYNTHESIS EXAMPLE 1

Preparation of Compound (2)

1.6 g of N-(4-tetrahydropyranyl)glycine and 7.2 g of 2-(2-anilinovinyl)-3-ethylthiazolinium iodide were added to 40 ml of acetic anhydride and immediately, 7 ml of treithylamine was added thereto with heating at 100° C., followed by stirring for 5 minutes. Temperature of the solution was restored to room temperature and ether was added thereto. The precipitate was collected by filtration and then washed with acetonitrile to obtain 1.05 g of the desired compound. m.p. 220° C. or higher (dec.), λ max (MeOH): 582 nm.

SYNTHESIS EXAMPLE 2

Preparation of Compound (4)

0.8 g of N-(4-tetrahydropyranyl)glycine and 3.3 g of anhydro-2-(2-anilinovinyl)-3-(3-sulfopropyl)-thiazolinium hydroxide were added to 20 ml of acetic anhydride and immediately, 3.6 ml of triethylamine was added thereto with heating at 100° C., followed by stirring for 5 minutes. Temperature of the solution was restored to room temperature and ether was added thereto. The precipitate was collected by filtration and then was dissolved in 30 ml of a methanolic solution containing 1% of acetic acid with heating and to the solution was added a solution of 5 ml of water containing 0.5 g of sodium acetate, followed by stirring at room temperature for 1 hour. The precipitated crystal was collected by filtration and washed with a methanolic solution containing 1% of acetic acid and then with ether to obtain 0.45 g of the desired compound. m.p. 262° C. or higher (dec.), λ max (MeOH): 583 nm.

Silver halide photographic emulsions in which the sensitizing dyes represented by the formula (I) of the present invention are used are any of silver chloride, silver bromide, silver iodobromide, silver chloroiodobromide and the like which ar prepared by usual methods. The sensitizing dye of the present invention can be added to these silver halide photographic emulsions as an aqueous solution or a solution in organic solvents freely miscible with water such as methanol, ethanol, acetone, cellosolve, pyridine, and dimethylformamide or a solution in mixed solvents thereof. Besides, the sensitizing dye in the form of solid particles as they are can be dispersed in the emulsion. Furthermore, the sensitizing dye can be added at any stage during preparation of the silver halide photographic emulsion, but preferably is added just after completion of second ripening. Addition amount of the sensitizing dye differs depending on the kind of the sensitizing dye or silver halide photographic emulsion, but can be used in a wide range of about 4–1200 mg per 100 g of silver halide in terms of silver nitrate.

Silver halide photographic emulsions in which the sensitizing dye of the present invention is used may be subjected to noble metal sensitization, sulfur sensitization, reduction sensitization or combination of these sensitizations or sensitization with addition of a polyalkylene oxide compound. The silver halide photographic emulsions in which the sensitizing dye of the present invention is used may optionally be subjected to spectral sensitization with other sensitizing dyes such as known cyanine dyes, merocyanine dyes and the like in combination and in addition, may further contain additives such as stabilizers, surface active agents, hardeners, fluorescent brighteners, ultraviolet absorbers, filter dyes, irradiation inhibiting dyes, antihalation dyes, preservatives, plasticizers, matting agents, and color couplers in accordance with known methods. Moreover, the emulsions may contain a developing agent or a precursor thereof when they are used for light-sensitive materials to be subjected to stabilization processing.

As supports coated with silver halide photographic emulsion in which the sensitizing dye of the present invention is used, there may be used, for example, baryta papers, plastic-laminated papers, synthetic papers, and resin films such as cellulose triacetate and polyethylene terephthalate. These supports may be optionally provided with a subbing layer and an antihalation layer by known methods.

The present invention will be explained in detail by the following nonlimiting examples.

EXAMPLE 1

The sensitizing dyes of the present invention, Compounds (2), (4), (6) and (23) and the following comparative dyes, Compounds (24), (25) and (26) as 0.05% methanolic solutions in the amounts as shown in Table 1 (per gram of silver halide in terms of silver nitrate) were added to silver chloride emulsions prepared in accordance with conventional process. Each of these emulsions was left for 45 minutes at 40° C. to stabilize the spectral sensitizing action. Thereafter, given amounts of a stabilizer, a surface active agent and a hardener were added to the emulsion and this emulsion was coated on a support of polyethylene laminated paper, dried and left overnight at 40° C. Then, the coated support was cut to a suitable size to make test samples. Each of these samples exposed in accordance with ISO process was developed with D-72 (developer formulation of Eastman Kodak Co.) at 20° C. for 90 seconds and then subjected to stopping and fixing treatments, further washed with water and dried to obtain strips having the desired black and white images, which were subjected to measurement of density by Macbeth RD-914 densitometer manufactured by Macbeth Corporation to obtain sensitivity and fog. Standard point of optical density for determination of the sensitivity was 0.75. Moreover, the sensitivity was expressed by relative value when sensitivity of the sample to which no sensitizing dye was added was assumed to be 100. Residual coloration (stain) of the sample after development was determined in the following manner. That is, unexposed sample (amount of dye: 3.6 ml) was dipped in D-72 developer from which metol and hydroquinone were omitted for 30 seconds at 20° C., then fixed for 30 seconds, washed with water for 30 seconds and dried, and the sample was visually evaluated by the five grades of 5 (best)–1 (worst).

The dyes used for comparison are shown below.

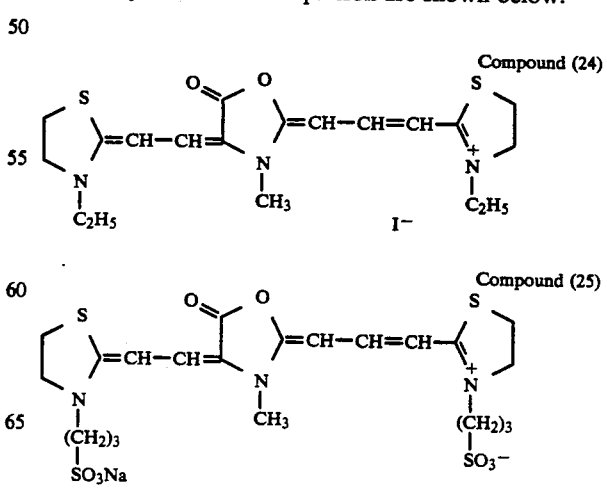

-continued

Compound (26)

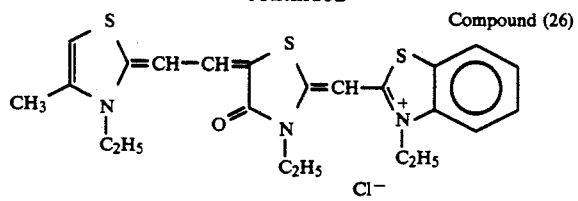

TABLE 1

| Sensitizing dye | Addition amount (ml) | | | | Stain | Note |
|---|---|---|---|---|---|---|
| | 0.4 | | 1.2 | | | |
| | Sensitivity | Fog | Sensitivity | Fog | | |
| Compound (2) | 1940 | 0.06 | 3960 | 0.06 | 5 | The present invention |
| Compound (4) | 1910 | 0.06 | 3770 | 0.06 | 5 | The present invention |
| Compound (6) | 1900 | 0.06 | 3750 | 0.06 | 5 | The present invention |
| Compound (23) | 1890 | 0.06 | 3810 | 0.07 | 5 | The present invention |
| Compound (24) | 1780 | 0.06 | 3880 | 0.07 | 3 | Comparative |
| Compound (25) | 1810 | 0.06 | 3660 | 0.07 | 4 | Comparative |
| Compound (26) | 1520 | 0.06 | 3290 | 0.07 | 2 | Comparative |
| No | 100 | 0.06 | 100 | 0.06 | 5 | — |

As is clear from the above example, the sensitizing dyes of the present invention are superior to the comparative dyes in sensitivity, fog, and stain.

What is claimed is:

1. A silver halide photographic light-sensitive material which comprises a support and, provided thereon, a silver halide emulsion which contains at least one sensitizing dye represented by the following formula (I):

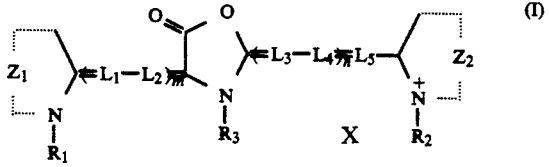

wherein $R_1$ and $R_2$ may be identical or different and each represents an alkyl group, an aralkyl group, an alkenyl group or an aryl group, $R_3$ represents a heterocyclic group, $Z_1$ and $Z_2$ may be identical or different and each represents a group of atoms necessary to form a 5- or 6-membered nitrogen-containing heterocyclic ring, X represents a counter ion, $L_1$ to $L_5$ each represents a methine group, and m and n each represents 0, 1 or 2.

2. A silver halide photographic light-sensitive material according to claim 1, wherein amount of the sensitizing dye is 4–1200 mg based on 100 g of silver halide in terms of silver nitrate.

* * * * *